United States Patent [19]

Wheelwright et al.

[11] 4,045,776
[45] Aug. 30, 1977

[54] ELECTRONIC PHONOGRAPH SELECTOR AND MEMORY SYSTEM

[75] Inventors: Robert W. Wheelwright, Tonawanda; Peter E. Solender, Williamsville, both of N.Y.

[73] Assignee: The Wurlitzer Company, Chicago, Ill.

[21] Appl. No.: 678,441

[22] Filed: Apr. 19, 1976

Related U.S. Application Data

[63] Continuation of Ser. No. 467,208, May 6, 1974, abandoned.

[51] Int. Cl.² .............................................. G11B 19/08
[52] U.S. Cl. .................................................. 340/162
[58] Field of Search .......................... 340/162; 194/15

[56] References Cited
U.S. PATENT DOCUMENTS 3,891,970  6/1975  Brotz ..................................... 340/162

Primary Examiner—Harold I. Pitts
Attorney, Agent, or Firm—Olson, Trexler, Wolters, Bushnell & Fosse, Ltd.

[57] ABSTRACT

The embodiment of the invention disclosed herein is directed to an electronic phonograph selector and memory system which enables the selection of records to be played after the proper amount of credits have been accumulated in a coin accumulating circuit. The system has a movable record carriage for placing a desired one of a plurality of records at a playing location. The record carriage is transported by receiving a drive signal indicating that a new carriage position is required. The code signal information is compared so that when the carriage is at its desired location the search signal is removed. The movable carriage has a position encoder so that binary code signal information corresponding to the various positions of the carriage can be detected and compared to the codes stored in a random access memory circuit.

22 Claims, 3 Drawing Figures

ELECTRONIC PHONOGRAPH SELECTOR AND MEMORY SYSTEM This is a Continuation, of application Ser. No. 467,208, filed May 6, 1974, now abandoned.

BACKGROUND OF THE INVENTION

This invention relates generally to improvements in circuitry and apparatus used primarily in the field of juke boxes, and particularly to an all electronic phonograph selector and memory system that provides substantial improvements over existing control systems used in juke boxes and the like. However, it will be understood that while the invention is directed particularly to circuit arrangements used in the field of juke box construction, the specific invention disclosed herein can be used in other allied fields such as food vending machines, and the like.

Heretofore, the electrical and mechanical components used in juke box systems have been relatively expensive and complicated to manufacture so tht they operate reliably over relatively long periods of time.

Accordingly, it is an object of this invention to provide a new and improved electronic phonograph selector and memory system which is relatively inexpensive to manufacture and which provides a high degree of long term reliability and efficiency in use.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
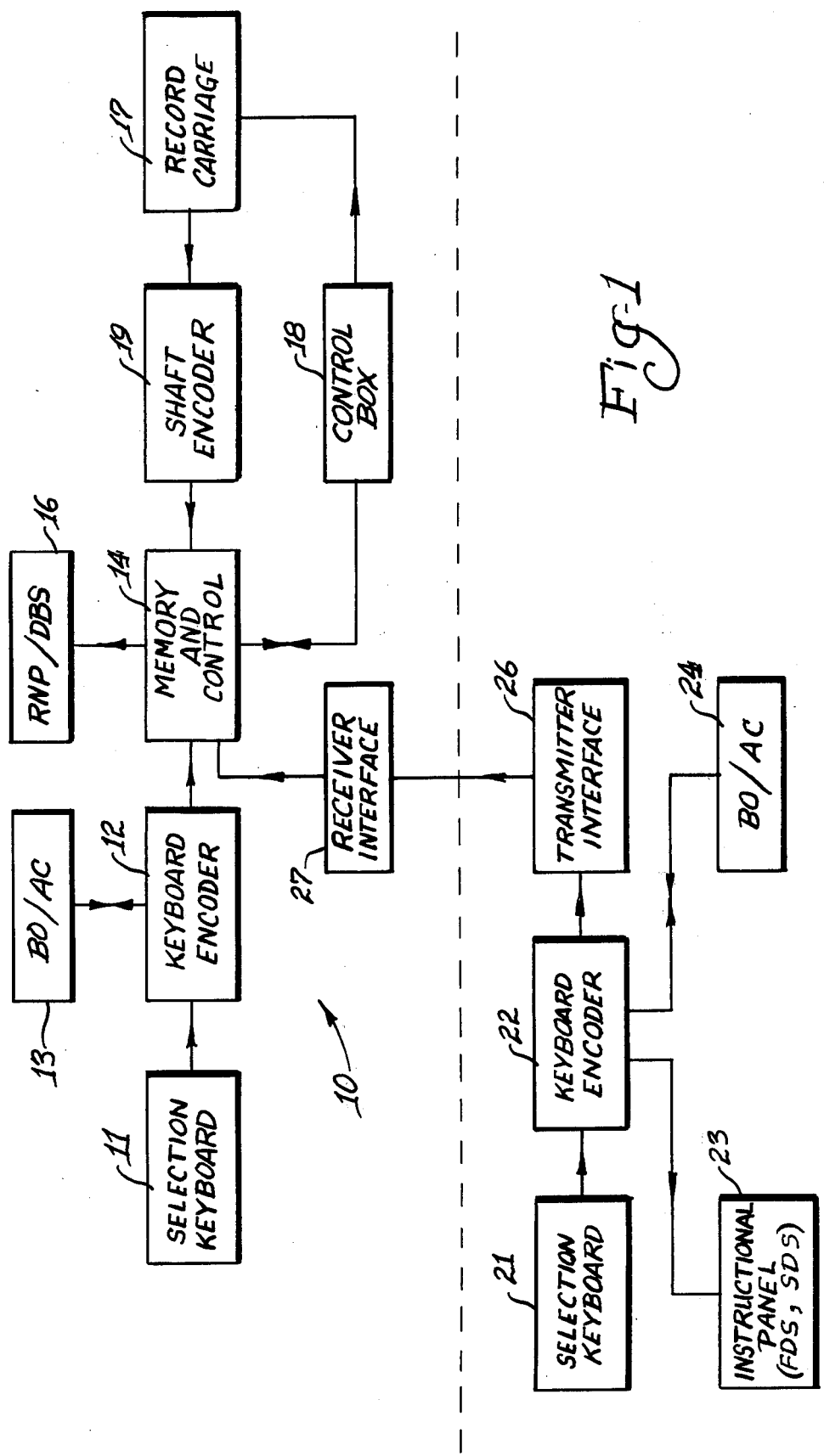
FIG. 1 is a block diagram illustrating the basic concepts of the electronic phonograph selector and memory system of this invention.

The basic block diagram of the electronic phonograph selector and memory system of this invention is illustrated in FIG. 1 and is designated generally by reference numeral 10. The system 10 has a keyboard selector input 11 coupled to a keyboard encoder 12. In the illustrated embodiment the selection keyboard 11 is a twelve button switching device with 10 buttons being used for digits zero through nine and two buttons being used for reset controls. Also coupled to the keyboard encoder is a coin operated credit accumulating circuit 13 which renders the entire circuit operative when the proper amount of coinage has been accumulated. In the illustrated embodiment the coin accumulator and credit circuit 13 may be of the type shown in pat. application Ser. No. 287,290 filed Sept. 8, 1972 now U.S. Pat. No. 3,815,720 and assigned to the same assignee of record.

The output of the keyboard encoder 12 is then deliered to a memory and control circuit 14. Preferably, the memory portion of the memory and control circuit 14 is a random acccess memory thereby eliminating the need of synchronized scanning of the memory. The output of the memory and control circuit 14 controls a portion 16 of the display panel which indicates the record now being played and which indicates the digit being selected from the selection keyboard 11.

A plurality of records, tapes, or other recording media is carried on a movable record carriage 17. The records on the carriage are placed in a playing position when a control signal is developed in the memory control circuit 14 and delivered to a control box 18 and therefrom to the record carriage drive motor. This control signal, therefore, causes the carriage to move to the desired playing position. The position of the carriage is detected by a shaft encoder 19, which may be an optical device, and which is also connected to the memory and control circuit 14. The signal from the selection keyboard 11 and the signal from the shaft encoder 19 are compared in the memory and control circuit and will stop the carriage when its proper position is sensed.

The electronic phonograph selector and memory system of this invention is capable of operation from remote locations such as booths in a restaurant or the like. In this instance, the remote selection of records is obtained by actuation of a selection keyboard 21 which, in turn, has its output associated with a keyboard encoder 22 similar to the encoder 12. The keyboard 21 is similar to the keyboard 11. The output of the encoder 22 is delivered to an instructional panel 23 which may provide information as to the first and second digits selected. The coin operated credit accumulating system 13 may include a remote portion 24 so that credit can be accumulated at the remote location by the insertion of coins. The output of the encoder 22 is delivered to a transmitter interface circuit 26 which, in turn, is connected to a receiver interface circuit 27. The output of the interface circuit 27 is then coupled to the memory and control circuit 14. The operation of the selection keyboard and keyboard encoders 21 and 22, respectively, may be substantially the same as that of selection keyboard and keyboard encoders 11 and 12, respectively.

The entire circuitry associated with the electronic phonograph selector and memory system preferably is contained on two large scale integrated circuit chips (LSI Chips) which perform all of the required selection data and memory control processing functions. Furthermore, the shaft encoder 19 may be a switch sensing or magnetic sensing device if desired, thereby replacing the optical system.

The electronic phonograph selector and memory system 10 offers a number of significant improvements over the electromechanical systems presently utilized in coin operated phonograph systems such as juke boxes. Performance improvements of the all electronic system include an expanded top tunes and LP selection capability and a dual function seven segment "record now playing" indicator as well as instantaneous remote wall box selection code transmission. As mentioned above the keyboard selector 11 consists of 12 push button switches to provide zero through nine digit code selection and two reset controls. The selection code information is entered into the system one digit at a time until all three digits have been specified. The first digit input is that of hundreths, the second digit input is that of tens and the third digit input is that of units. However, it will be understood that the reverse condition can be incorporated without departing from the concepts of this invention.

The keyboard encoder processes the selection code into a BCD format which is used within the other components of the system. It also controls the selection process by preventing the entry of incorrect or disallowed codes. The keyboard encoder provides two distinct forms of selection data output information. In the main phonograph selection is transferred into the memory and control circuit in a digit by digit sequential manner for control of the digit being selected indicator. For memory inputs the second output, which transmits the entire selection in a single serial string, is utilized.

The memory and control circuitry 14 receives the selection information from the keyboard encoder 12 and stores it in a 200 bit electronic memory until the proper record position is sensed by the carriage encoder 19. It also decodes the selection information and carriage encoder output for use in the record now playing and digit being selected circuitry 16.

The selection keyboard 11 preferably is formed from a plurality of normally open momentary switches which have a common ground bus line and which have the output thereof connnected to the appropriate binary coded circuit. The switches of the selection keyboard may be mechanical or electronic in nature.

Figure 2:
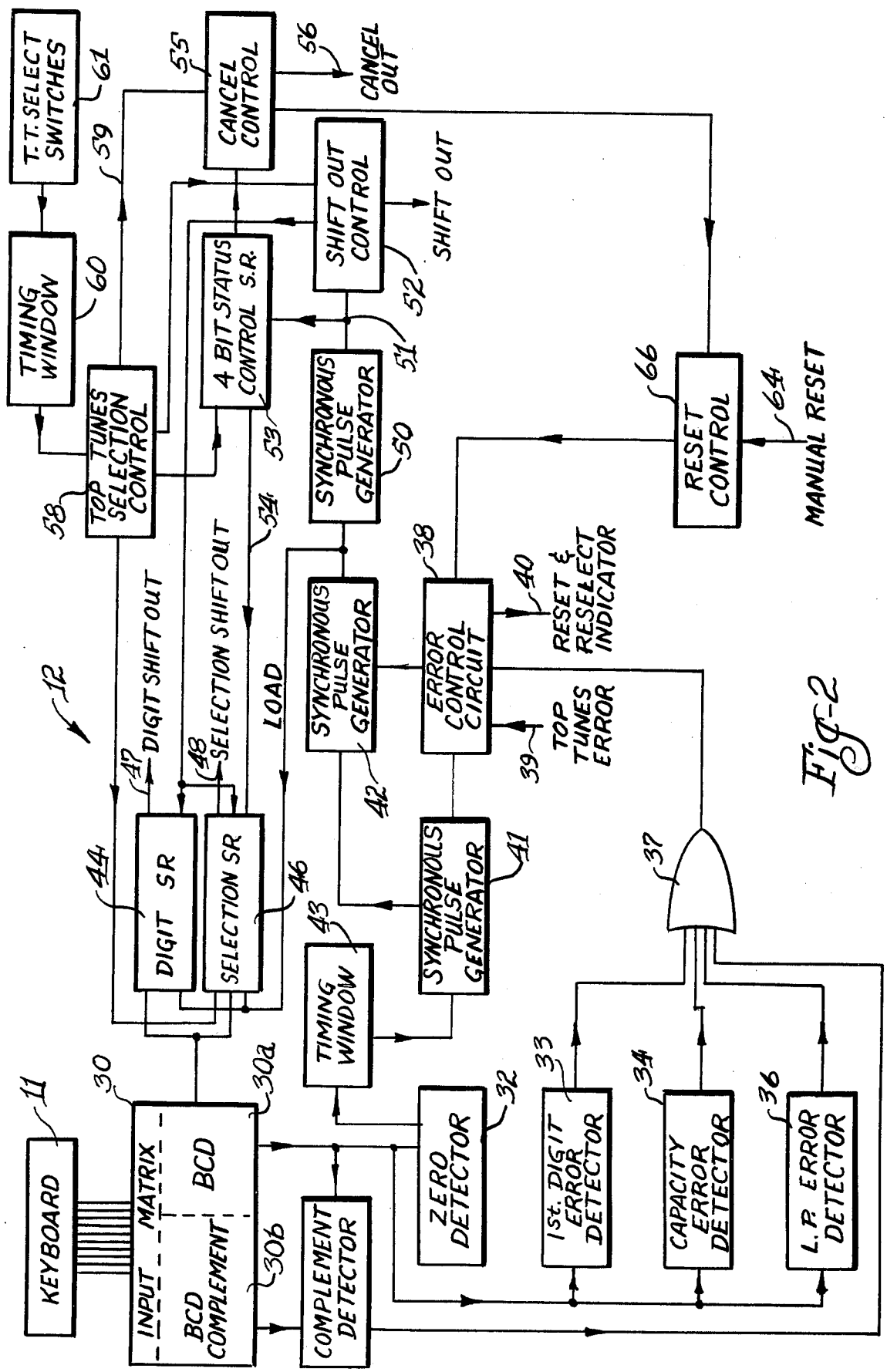
FIG. 2 is a block diagram of the keyboard encoder circuit arrangement of FIG. 1.

Referring now to FIG. 2 there is seen a more detailed functional block diagram of the keyboard encoder circuit 12 of FIG. 1. Here the keyboard selection control 11 is shown connected to an input matrix array 30. The keyboard matrix 30 consists of a number of buffer and multiple input AND gates which encode the decimal input switch closure information into a four bit BCD code and a four bit complement BCD code. The four bit code is generated in the portion 30a while the four hit complement BCD code is generated in the circuit portion 30b.

For purposes of explanation the following decimal binary code conversion is utilized for switch closures from zero to nine.

| Switch Closure | BCD | Complement BCD |
| --- | --- | --- |
| none | 1111 | 1111 |
| 0 | 0000 | 1111 |
| 1 | 0001 | 1110 |
| 2 | 0010 | 1101 |
| 3 | 0011 | 1100 |
| 4 | 0100 | 1011 |
| 5 | 0101 | 1010 |
| 6 | 0110 | 1001 |
| 7 | 0111 | 1000 |
| 8 | 1000 | 0111 |
| 9 | 1001 | 0110 |

Each of the BCD codes and its complement are combined in an OR gate arrangement designated generally by reference number 31 for comparison. As can be seen by the above table a single closure of one of the decimal switches will produce a logic 1 state at all four binary outputs of the matrix. If two or more switches are closed simultaneously, either accidently or deliberately, one or more OR gates will have a logic 0 output since the encoding matrix 30 has circuitry which provides for override of the logic 1 when a logic 0 is present.

The BCD portion 30a is coupled to a zero detector circuit 32 and to a plurality of error detector circuits 33, 34 and 36. The error detector circuit 33 will produce an output when there is an error in the selection of the first digit, while the error selector circuit 34 will produce an error signal corresponding to the capacity error. The detector circuit 36 produces an error output for long play selection should the user inadvertently press the wrong number sequence. The output of each of error detector circuits 33, 34 and 36 is delivered to OR gate 37 which, in turn, is coupled to the input of an error control circuit 38. Also coupled to the error control circuit 38 is a top tunes error signal over line 39 and a reset and reselect indicator output line 40.

The error control circuit 38 forms part of a closed loop circuit comprising synchronous pulse generator circuits 41 and 42 which provide the timing output pulses for the transfer of the digits being selected in the matrix circuit 30. To insure proper timing sequencing a timing window, or time frame detector circuit 43 is utilized. The output of the synchronous pulse generator 42 is delivered to the digit shift register 44 and to a selection shift register 46. This therefore will produce the appropriate transfer signal information from the matrix 30 so that the proper binary coded digit will be produced at the output line 47 or the proper selection of pulses signal infomation produced at the output line 48. These signals are delivered to the memory and control circuit 14 of FIG. 1.

The synchronous plate generator also includes a circuit portion 50 which has an output line 51 connected to a shift out control circuit 52 and to a four bit status control shift register 53. The output of the four bit status control shift register 53 is coupled to the selection shift register 46 over a line 54. The four bit status shift register is also delivered to a cancel control circuit 55 which, in turn, produces an output pulse on line 56 to cancel credits stored in the coin accumulating and credit storage circuit 13 of FIG. 1. Top tunes selection control circuit 58 also has an output line 59 thereof connected to the cancel control circuit 55 so that cancellation of credits of the appropriate amount can be obtained when the selection of top tunes is made. A timing window circuit 60 has the output thereof connected to the top tunes selection control circuit 58 and a top tune selection switching arrangement 61 is connected to the input of the timing window. Therefore, when the top tune selector switches are actuated the selection information is delivered to the top tune selection control through the timing window only at the appropriate time frame sequence.

The entire circuit can be manually reset by a reset switch connected to a line 64 which, in turn, is connected to a reset control circuit 66. The reset control circuit 66 is coupled back to the error control circuit 38 and also receives a cancel control pulse signal from the cancel control circuit 55. Therefore, the function block diagram of FIG. 2 illustrates means for converting decimal signal information into a binary coded signal information and delivering this binary code to a digit shift register which, in turn, is coupled to the memory and control circuit of FIG. 1. The circuit further provides means for detecting any errors in the selection process.

Figure 3:
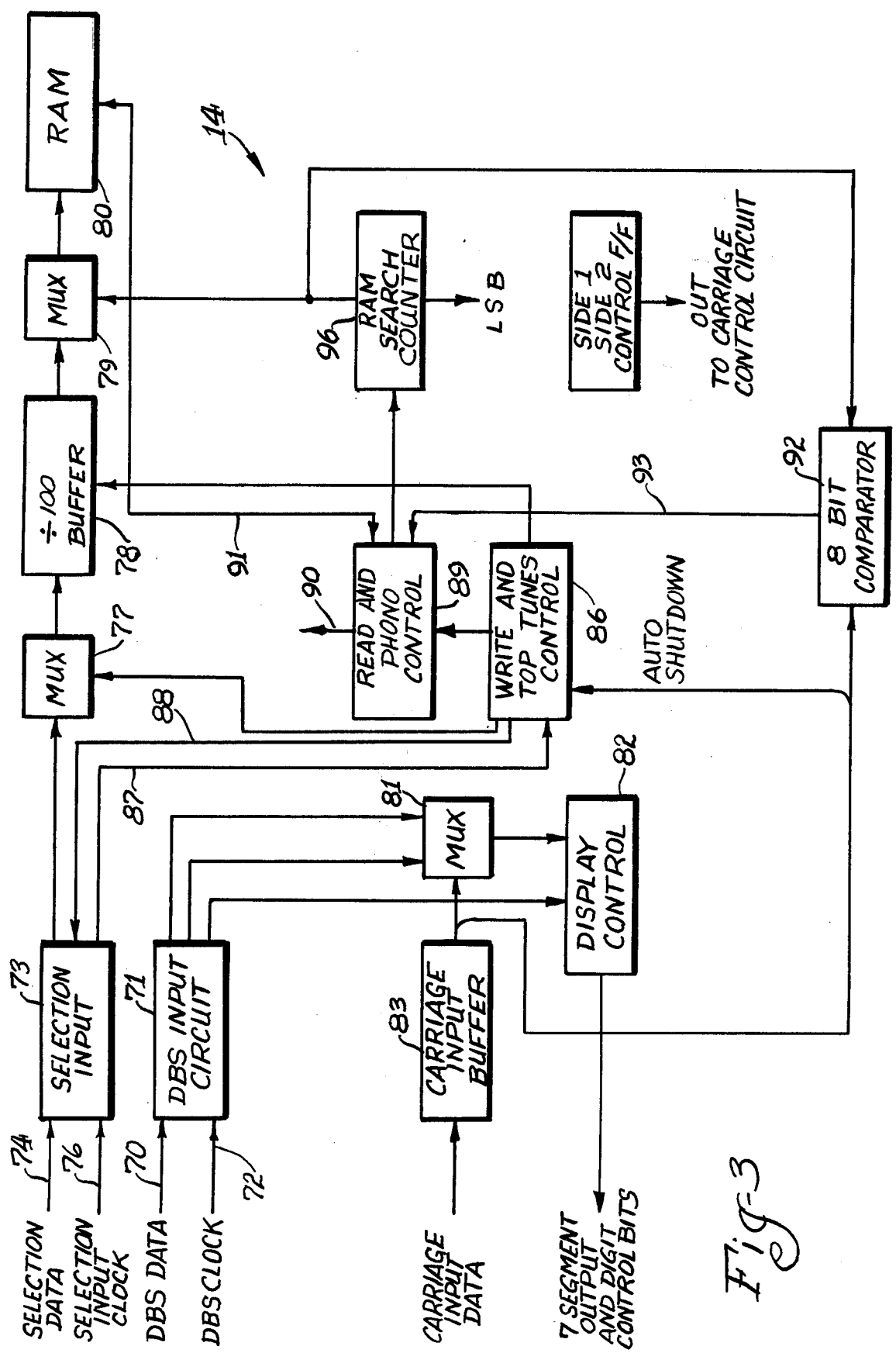
FIG. 3 is a block diagram of the memory and control circuit arrangement of the system of FIG. 1.

Referring now to FIG. 3 there is seen a functional block diagram of the memory and control circuit 14 of FIG. 1. Here the digit input signal information is delivered to the circuit 14 over a digit being selected data line 70 which, in turn, is coupled to the input circuit 71 together with a digit clock control line 72. The selection data information is delivered to a selection input circuit 73 over a line 74 while the selection input clock is coupled to the input 73 over a line 76. The output of the selection input circuit is delivered through a multiplex circuit portion 77 and therefrom to a divide by 100/ buffer circuit 78. The output of the divide by 100/ buffer circuit 78 is delivered to a second multiplexing arrangement 79 whose output is fed to a random access memory circuit 80. By utilizing a random access memory the need for synchronous scanning of the memory is eliminated.

The output of the digit being selected input circuit 71 is coupled to a multiplexer circuit 81 which, in turn, has its output coupled to a display control circuit 82. Also coupled to the multiplexer circuit 81 is a carriage input buffer circuit 83 which receives carriage input data as to the present position of the carriage. The output of the display control circuit 82 produces a seven output and digit control bits to be utilized in displaying the digit being selected or record now playing information.

A write and top tunes control circuit 86 has an input line thereof coupled to the selection input 73 over a line 87 and an output line feeding back to the selection input circuit 73 over a line 88. Also the write and top tune control circuit is coupled to a read and phono control circuit 89 which has output lines 90 coupled to the phonograph (through the control box) for controlling the movement of the carriage and the playing of the records.

The read and phono control circuit 89 also has an inputfrom the randon access memory 80 over a line 91 and the second input from an eight bit comparator control circuit 92 over a line 93. The comparator circuit 92 is coupled to the random access memory search counter circuit 96.

Desired selections are entered into the RAM (circuit 80) by inserting (writing) "1's" in corresponding address locations. All of the address locations normally are at a logic 0 with no selection being played. The address location for a particular selection is determined by selection data which enters and is stored in circuit 73 and is combined with top tune decoded information in the multiplexer circuit 77 and divide by 100/ buffer circuit 78. The resulting address information is passed through multiplexer circuit 79 to the RAM circuit 80 address line inputs. After the RAM circuit 80 has acted on the particular input data by wrting a "1" on command from the write and top tunes control circuit 86, a reset signal is sent to the selection input circuit 73 by way of line 88.

During those time periods when no input data is being processed, the multiplexer circuit 79 passes the RAM search counter circuit 96 outputs to the address inputs of RAM circuit 80. The RAM search counter continuously cycles through all its states and as soon as "1" is recognized in a particular address location (indicating that data had been written into that location from received information from the selection input circuit 73 some time earlier), the RAM search counter 96 stops cycling and the read and phono control circuit 89 produces a command to the phonograph through line 90 causing the carriage to rotate.

As soon as the carriage input buffer circuit 83 contents (containing shaft position data) matches the states where the RAM search counter 96 was stopped in 8 bit comparator circuit 92, a command signal is sent to the phonograph commanding the carriage to stop rotating. The phonograph record or tape at that location will be reproduced by record or tape player mechanism well known in the art.

When the carriage stopped rotating, the RAM search counter 96 will begin cycling again looking for others "1's" in the RAM circuit 80. If an additional "1" is found, the RAM search counter 96 will stop cycling, and when the record or tape being played is completed, the carriage will rotate again looking for a new carriage position to match the new RAM search counter 96 holding location. The process will continue until no "1's" are left in the RAM circuit 80.

What has been described is an improved circuit arrangement wherein all of the components between the carriage output shaft, which has suitable encoder means thereon, and the digit selection, for selecting records, are substantially completely electronic in nature and are readily adapted to being formed from large scale integrated circuit chips. Many variations and modifications may be effected without departing from the spirit and scope of the novel concepts disclosed and claimed herein.

The invention is claimed as follows:

1. In an electronic phonograph selector and memory system the combination comprising: a movable record carriage for carrying a plurality of record means and selectively placing each of said record means at a playing position where it will be played, first encoder means including output detector means associated with said movable record carriage for producing a binary coded output signal corresponding to the position of said movable record carriage, selection keyboard means to be manipulated by the user for the selection of a predetermined one of the plurality of record means of said movable record carriage, second encoder means coupled to said selection keyboard means for producing a predetermined binary code signal output from the actuation of said selection keyboard means, said predetermined binary code signal output corresponding to a given one of the plurality of said record means on said movable record carriage, and non-synchronous random access memory and control circuit means coupled to said first and second encoder means for receiving said binary coded output signal and said binary code signal output, respectively, and directly comparing these signals to produce a drive signal for transporting said movable record carriage and stopping said carriage when a predetermined comparison is formed and thereby to place a selected one of said record means at the playing position.

2. In the electronic phonograph selector and memory system as set forth in claim 1 wherein said first and second encoders operate in response to digital code signal information.

3. In the electronic phonograph selector and memory system as set forth in claim 1 wherein said selection keyboard means includes 12 selector keys, 10 of said keys representing digits zero through nine and two of said keys being reset keys.

4. In the electronic phonograph selector and memory system as set forth in claim 3 wherein the first actuation of said selector keys represent the hundredths digit, the second actuation of the selector represents the tens digits and the third selection of said selector keys represents units.

5. In the electronic phonograph selector and memory system as set forth in claim 1 and further including a coin operated enabling circuit connected to said second encoder means to be operated when the proper amount of credits from coins have been accumulated.

6. In the electronic phonograph selector and memory system as set forth in claim 1 and further including a plurality of selection keyboard means at remote locations and interconnected with said memory and control circuit to enable users at remote locations to operate the electronic phonograph selector and memory systems.

7. In the electronic phonograph selector and memory system as set forth in claim 1 wherein said first encoder means has an optical scanner and readout associated with the output shaft of said movable record carriage.

8. In an automatic phonograph adapted to play a multiplicity of selections identified by respective multi-digit numbers and having credit registering means which produces a credit signal indicating the existence of a credit equalling at least the price of a play, apparatus for visibly displaying the number of a selection including,
- a digital control circuit providing digital information corresponding to either a digit being selected or record now playing information
- a keyboard having a plurality of manually operable devices corresponding respectively to the digits adapted to make up a selection identification number,
- and means responsive to said credit signal and to operation of said devices to cause said display control circuit to provide segment output and digit control bits for transmission to a display means.

9. Apparatus as in claim 8 including means for inhibiting said display control circuit when the first digit selected is other than one of two predetermined digits.

10. Apparatus as in claim 8 in which said display control circuit comprises means responsive to actuation of one of said manually operable devices for producing a binary coded decimal representation of the digit corresponding to the actuated switch.

11. In an automatic phonograph having a playing unit adapted selectively to play a multiplicity of selections identified by multiple-digit numbers in response to input signals representing said numbers and to produce an output signal representing a selection presently being played, said input signals being of the same character, and having credit registering means which produces a credit signal indicating the existence of a credit at least equal to the price of a play, a control circuit providing digital information corresponding to the number of a selection a keyboard having a plurality of manually operable devices adapted to be actuated to provide a multiple digit selection signal, means normally coupling said playing unit output signal to said control circuit to provide digital information corresponding to the number of a selection being played, means responsive to said credit signal and to actuation of a number of said devices corresponding to the number of digits in a selection identification number for deactivating said output signal coupling means and for coupling said selection signal to said control circuit to provide digital information corresponding to the number of a selection to be played.

12. Apparatus as in claim 11 in which said deactivating and coupling means deactivates the output signal coupling means upon actuation of one of said devices 13. Apparatus as in claim 11 including means for inhibiting said deactivating and coupling means when any of the digits selected is not within a predetermined class of digits reserved for that particular place in the selection identification number.

14. Apparatus as in claim 11 including means for inhibiting said deactivating and coupling means when the first digit selected is other than one of two predetermined digits.

15. Apparatus as in claim 11 including means responsive to the simultaneous actuation of predetermined combinations of said manually operable switches for inhibiting the deactivating and coupling means.

16. Apparatus as in claim 11 in which said credit registering means also produces a second credit signal indicating the existence of a predetermined amount of credit equal to the price of a premium selection, said apparatus including means responsive to the absence of said second credit signal for inhibiting said deactivating and coupling means whenever any of the digits selected is not within a predetermined class of digits reserved for that particular place in the selection identification number.

17. Apparatus as in claim 16 in which said inhibiting means inhibits the deactivating and coupling means whenever the second digit selected is not within a predetermined class of digits.

18. In an automatic phonograph having a playing unit adapted selectively to play a multiplicity of selections identified by multiple-digit numbers in response to transmitted selection signals representing said numbers, said selection signals being made up of a plurality of digit signals correspondng to the number of digits in a selection identification number, and having credit registering means which produces a credit signal indicating the existence of a credit at least equal to the price of a play, apparatus for selection and display of the number of a selection including
- a register having a plurality of sections corresponding to the number of digits in a selection identification number, and which is capable of storing a signal representing said selection identification number,
- a control circuit providing digital information corresponding to a selection identification number,
- decoding means coupling the register to said control circuit
- a keyboard having a plurality of manually operable devices corresponding to the digits forming the selection identification number,
- means responsive to the actuation of one of said devices for generating a digit signal comprising a binary representation of the corresponding digit and for loading said digit signal into the register,
- means responsive to the absence of a credit signal for inhibiting said generating and loading means,
- means responsive to the loading of a sufficient number of digit signals into the register by said generating and loading means to form a selection signal for transmitting said signal to the playing unit.

19. Apparatus as in claim 18 in which said selection signal comprises a binary coded decimal representation of the selection identification number, and in which said register is a shift register capable of storing said selection signal.

20. Apparatus as in claim 19, in which said transmitting means include transmission channels leadng from said register to said playing unit, and in which said selection signal is transmitted as a serial train of pulses over a signal one of said transmission channels.

21. Apparatus as in claim 18 in which each of said devices corresponds to a different digit, and in which the selection signal which is loaded in response to the actuation of said devices is determined by the order in which said devices are actuated.

22. Apparatus as in claim 21 including means responsive to the simultaneous actuation of predetermined combinations of said manually operable devices for disabling the generating and loading means.

* * * * *